Dec. 22, 1959   R. K. PETRY   2,917,781
METHOD FOR MAKING THERMOPLASTIC COMPOSITION PRODUCTS
Original Filed Aug. 23, 1952   11 Sheets-Sheet 1

INVENTOR.
ROBERT K. PETRY
BY
ATTORNEY

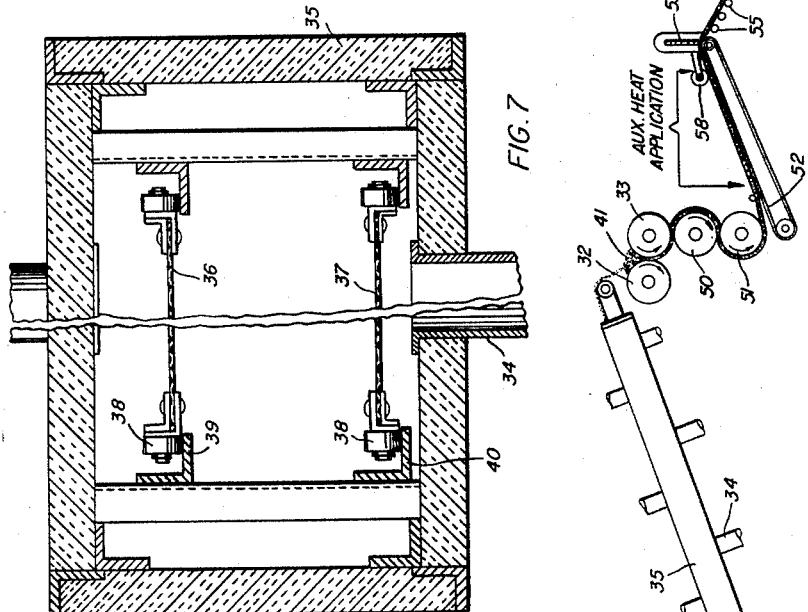
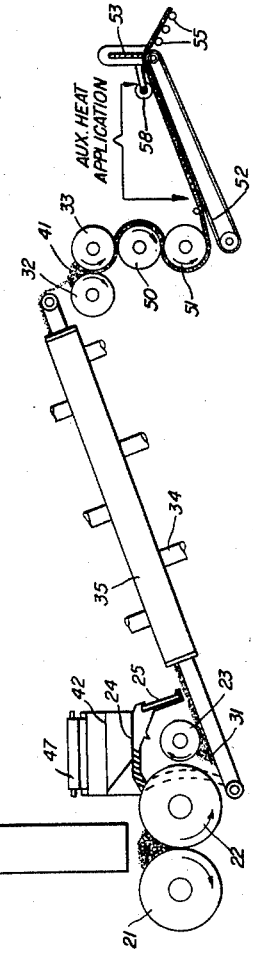
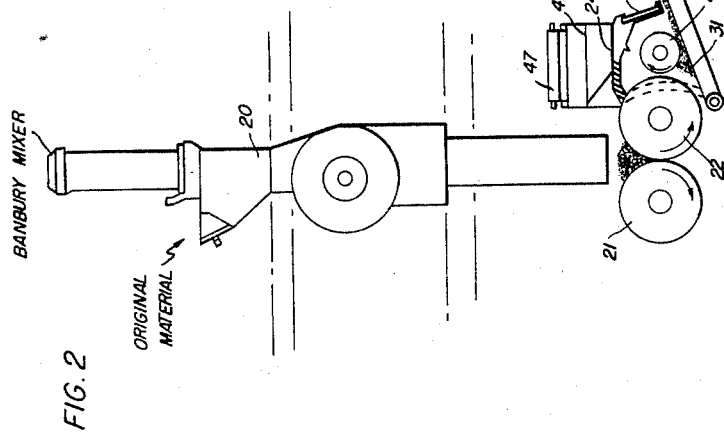

Dec. 22, 1959  R. K. PETRY  2,917,781
METHOD FOR MAKING THERMOPLASTIC COMPOSITION PRODUCTS
Original Filed Aug. 23, 1952  11 Sheets-Sheet 3
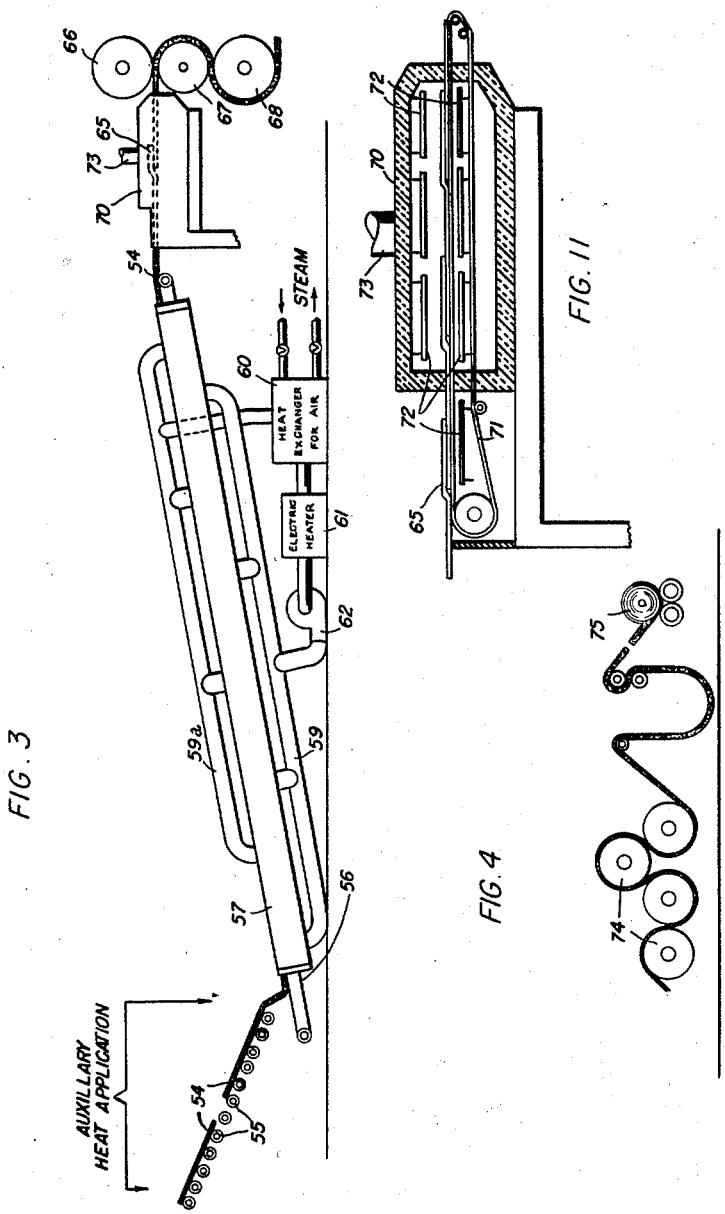
INVENTOR.
ROBERT K. PETRY

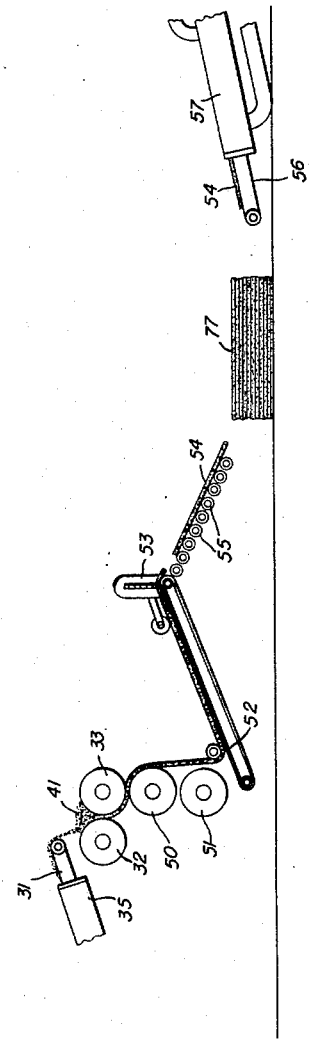

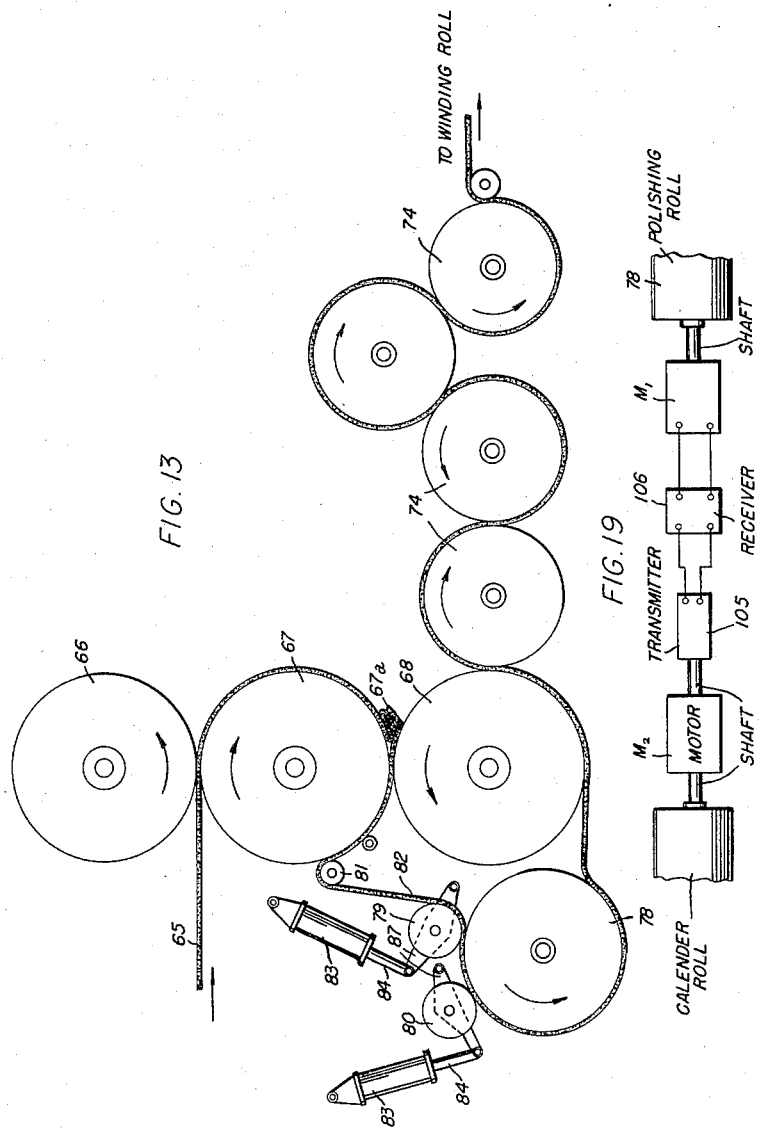

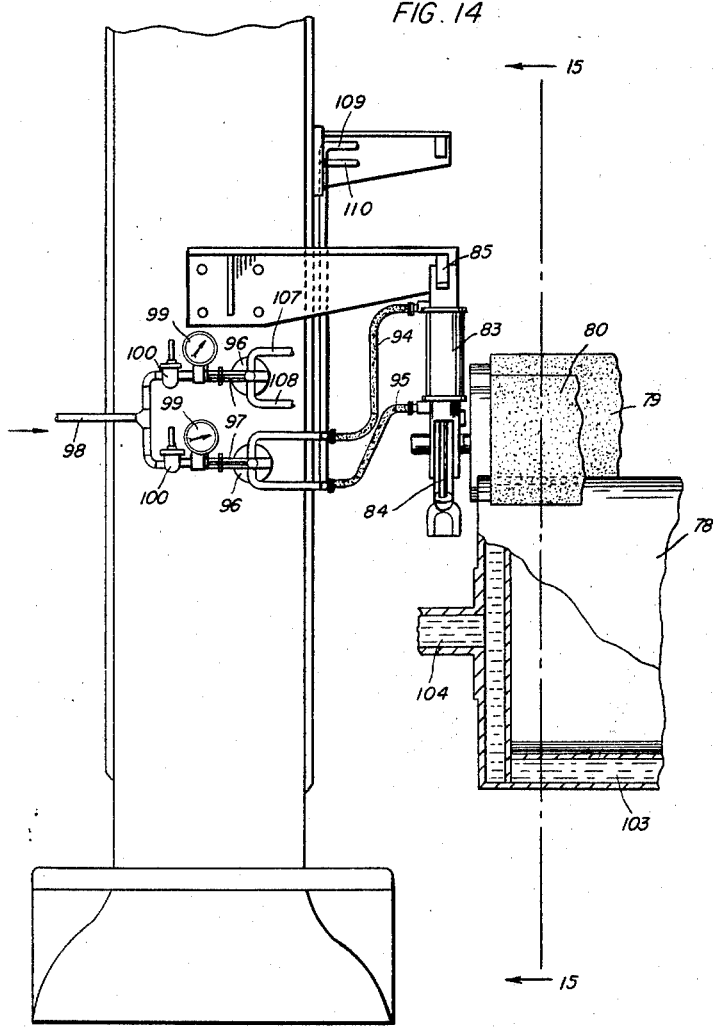

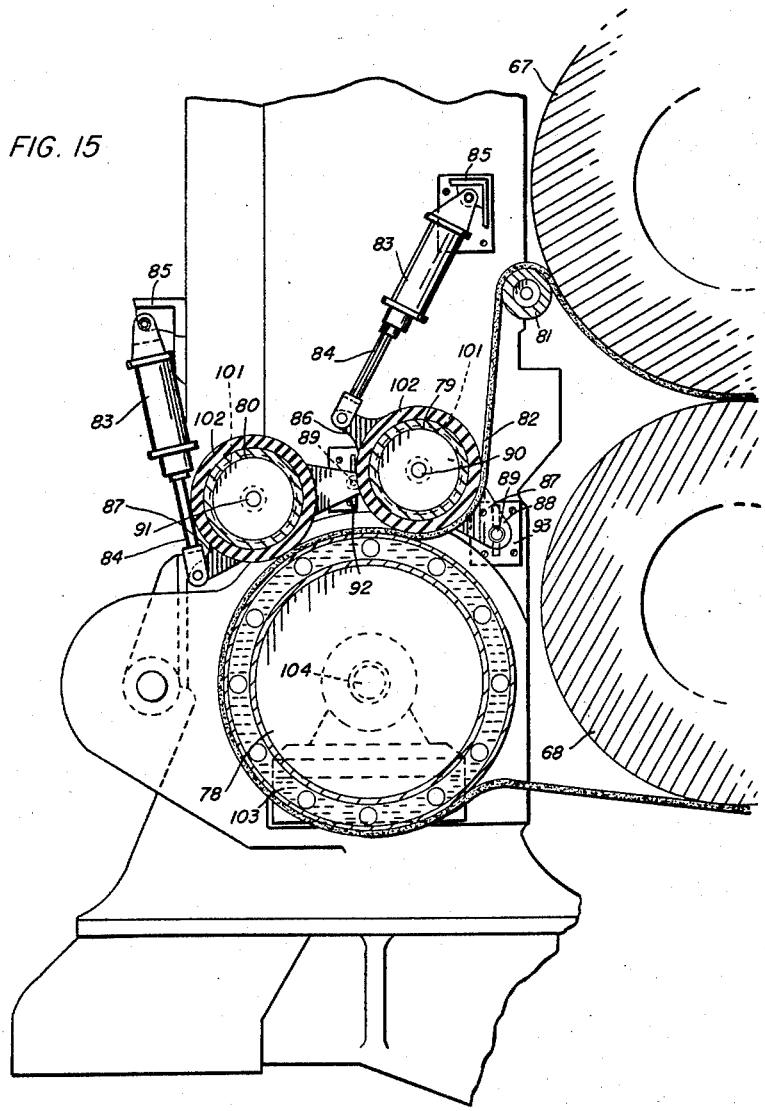

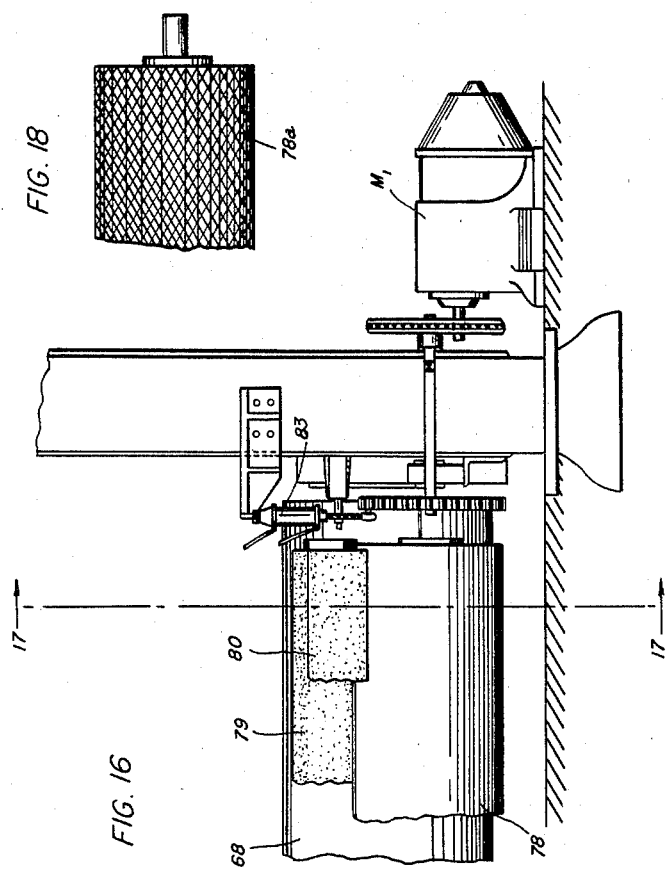

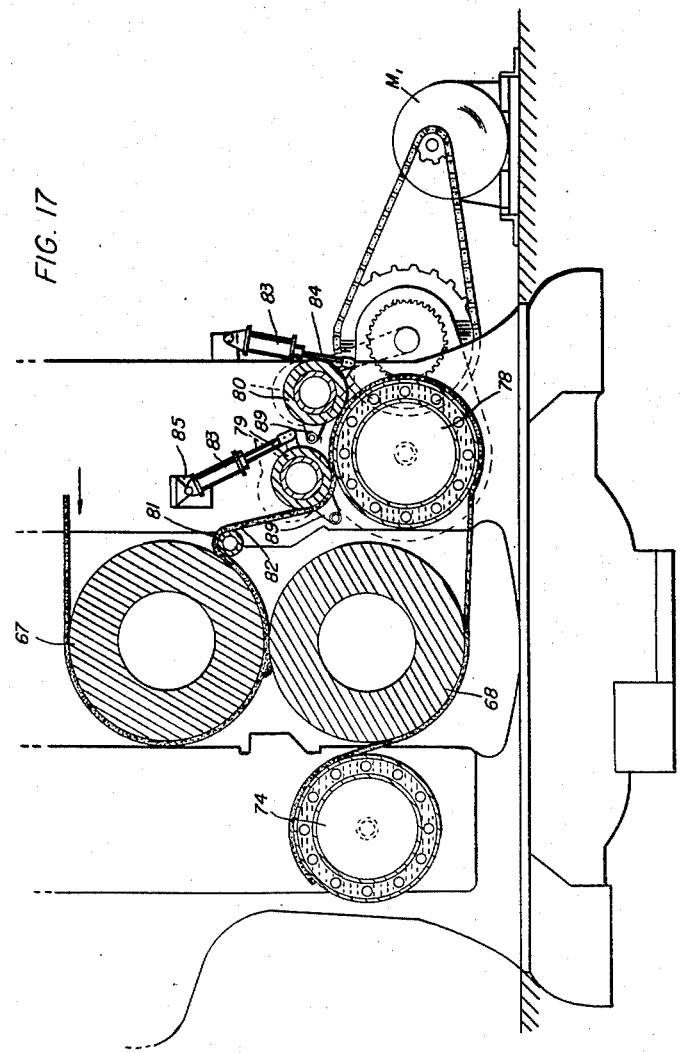

United States Patent Office 2,917,781
Patented Dec. 22, 1959

2,917,781

METHOD FOR MAKING THERMOPLASTIC COMPOSITION PRODUCTS

Robert K. Petry, Mountain Lakes, N.J., assignor to Congoleum-Nairn, Inc., Kearny, N.J., a corporation of New York Original application August 23, 1952, Serial No. 305,994. Divided and this application March 19, 1958, Serial No. 722,596

10 Claims. (Cl. 18—48.8)

This invention relates to method and apparatus for making thermoplastic composition products. It relates especially to method and apparatus for producing such products in sheet form, and to method and apparatus for producing products and sheets which are of variegated color. This application is a division of co-pending application S. N. 305,994, filed August 23, 1952 for "Method and Apparatus for Making Thermoplastic Composition Products" which is a continuation-in-part of my application Serial No. 43,274 filed August 9, 1948, for "Process and Apparatus for Manufacturing Thermoplastic Products" and of my application Serial No. 93,126 filed May 13, 1949 for "Manufacture of Thermoplastic resinous Sheet Material," both now abandoned.

More specific aspects of this invention relate to method and apparatus whereby such products may be successfully produced utilizing colored vinyl plastic composition comprising thermoplastic vinyl resin and filler.

Features and objects of this invention relate to steps and combinations of steps and to controls exercised therein whereby thermoplastic compositions such as a vinyl plastic composition may be successfully produced and formed into a product such as a sheet and whereby a sheet product may be produced suitable for use in flexible smooth surface coverings having either a plain color or a variegated color such as a jaspe or marbleized effect. Other features and objects of this invention relate to steps and combinations of steps and to controls exercised therein whereby improvements in quality and uniformity are afforded, and whereby improved appearance is afforded both as regards surface finish and as regards the definition and distinctness of color contrasts in the case of products of variegated color.

Certain of the objects and features of this invention relate to the employment in combination of steps and apparatus whereby a vinyl plastic composition is produced, is converted into particulate or granular form, and is formed into a sheet which may be provided with a gloss finish and which, if variegated, may be jaspe or marbleized, and to certain controls maintained therein which are critical to obtaining an improved product. While the steps and apparatus are preferably employed in combination certain of the features of this invention relate to subcombinations of steps and apparatus elements.

In the manufacture of a product such as a smooth surface covering, it has long been recognized that the employment of a thermoplastic composition which is sufficiently hard and tough at ordinary temperatures to be resistant to wear and indentation offers certain advantages due chiefly to the fact that such a composition, if it can be successfully formed into a satisfactory sheet, is ready for use immediately after cooling from an elevated temperature at which the thermoplastic composition can be worked. Such properties of a thermoplastic composition are to be contrasted with those of conventional linoleum composition which depends on the use in the binder therefor of a drying oil such as linseed oil that hardens by oxidation. During the manufacture of a linoleum type floor covering the linoleum composition is initially prepared using a drying oil which is only in a partially oxidized condition whereby the linoleum compostion at normal temperatures is of a putty-like consistency permitting it to be mixed, sheeted and made adherent to a suitable base sheet. However, such a linoleum type floor covering after its initial production is not ready for use due to the soft putty-like consistency of the layer of linoleum composition. In order to harden the layer of linoleum composition it is necessary to season it and such seasoning requires prolonged exposure to air at an elevated temperature in an operation which is costly both from the point of view of the time and labor involved and from the point of view of the size and cost of the equipment which is required. However, notwithstanding such disadvantages inherent in the use of linoleum composition or the like, the bulk of the flexible smooth surface coverings that have been manufactured and sold heretofore have been of the linoleum type comprising a molded layer of linoleum composition or have been of the type wherein a suitable paint or the like is applied to a suitable base sheet as by a printing operation. This has been due principally to the difficulties that have been encountered in successfully formulating and processing a thermoplastic composition whereby a commercially satisfactory product may be obtained. Moreover, while linoleum composition lends itself to processing whereby attractive floor coverings of variegated color may be obtained such as jaspe or marbleized coverings, especially severe difficulties have been encountered in connection with attempting to produce such products using a thermoplastic composition. According to this invention such difficulties have been successfully overcome and highly satisfactory flexible smooth surface coverings have been produced both of plain color and of variegated color using a thermoplastic composition material. It is an advantage of this invention that the aforesaid objectives have been attained in a manner which is economical and practical and by which accurately reproducible results are obtainable at a high production rate.

One of the features of this invention relates to production of heat plasticized particles of thermoplastic composition by novel method steps and apparatus whereby under requisitely controlled temperature conditions a thermoplastic composition is mixed, is sheeted and is made adherent as a sheet to a rotating roll, the heat plasticized sheet being converted into particles by gouging the particles therefrom while it is carried in adherent relation on the surface of the rotating roll. Other features of this invention relate to the production of a calendered sheet by the sequential operations of sheeting a heat plasticized mass of thermoplastic composition, converting the resultant sheet to the form of heat plasticized particles, and calendering the heat plasticized particles.

Other features of this invention relate to the production of heat plasticized particles of thermoplastic composition having different colors and the commingling of same to form a mixture of variegated color imparted by the particles and the subsequent calendering of the mixed particles under conditions of control that are critical to obtaining improved sheets of variegated color.

Other features of this invention relate to method steps and apparatus whereby an improved surface finish is obtained, and whereby such improved surface finish is obtained while at the same time providing improved color definition in the case of sheets of variegated color.

The foregoing and other objects, features and advantages of this invention are further developed hereinbelow in connection with the following more detailed description of this invention and the exemplification thereof in connection with the accompanying drawings, wherein Fig. 1 is a flow sheet on which is indicated an overall sequence of apparatus and steps in which this invention and the different features thereof may be typically employed;

Fig. 2 is a diagrammatic elevation view of a portion of a main chain of apparatus employed in the process;

Figs. 3 and 4 are successive continuations of Fig. 2, and the three figures represent a single set of apparatus divided in the drawings for the purpose of presenting them in larger scale than would be possible if the whole of the apparatus were shown on a single sheet;

Fig. 7 is a vertical section of a heated conveyor employed in the apparatus;

Fig. 11 is an enlarged view showing a portion of the apparatus in Fig. 3, partly in vertical section;

Fig. 12 is a diagrammatic side elevational view of a modified arrangement in the main chain of the apparatus;

Fig. 13 is a diagrammatic elevational representation of a modification of the apparatus shown in Figs. 3 and 4 wherein according to preferred practice of this invention a glossing or polishing roll is employed in combination with the calender and cooling rolls shown in Figs. 3 and 4;

Figure 1:
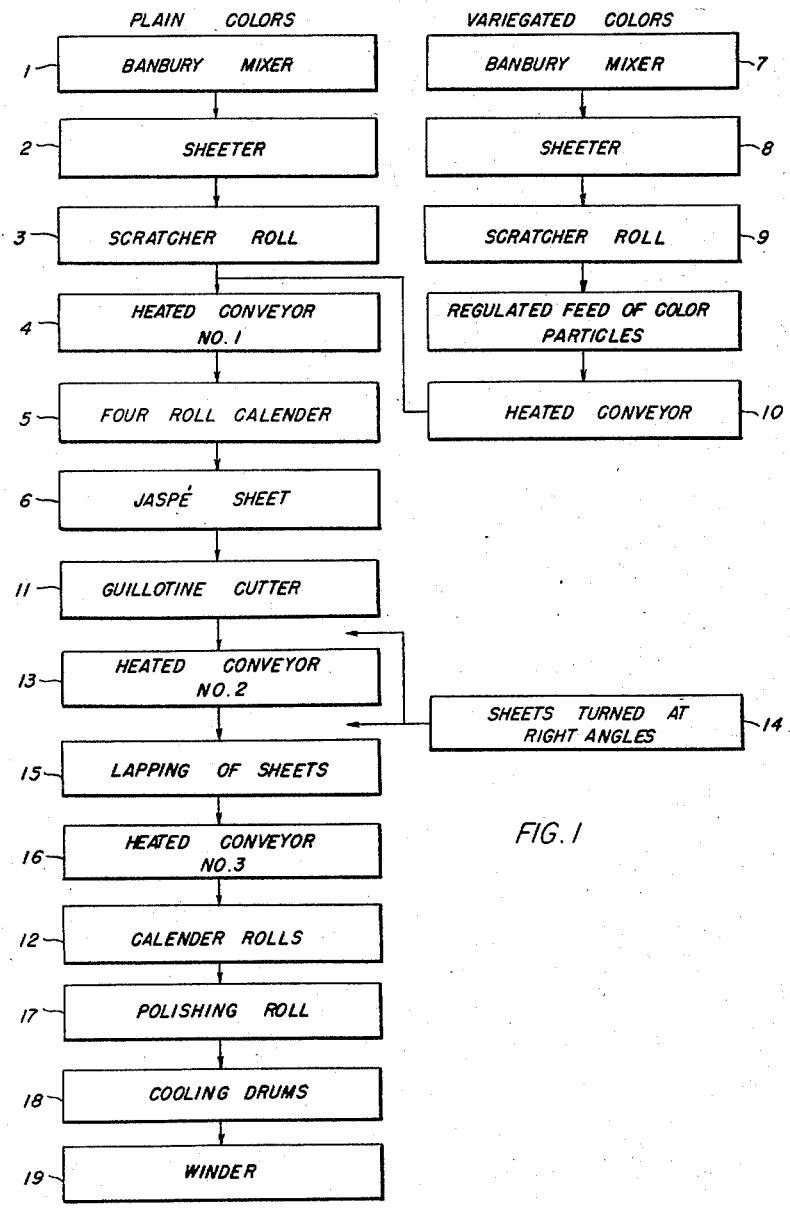

Figs. 14 to 17 inclusive are various views showing mechanisms associated with and used in operating the glossing roll shown in Fig. 13 wherein, more particularly, Fig. 14 is a fragmentary side elevation of the apparatus at one end of the glossing roll in association with mechanisms for performing a glossing operation, Fig. 15 is a vertical section taken on the line 15—15 of Fig. 14 in the direction of the arrows, Fig. 16 is a fragmentary side elevation of the apparatus at the end of the glossing roll opposite the end shown in Fig. 14, and Fig. 17 is a vertical section taken on the line 17—17 of Fig. 16 in the direction of arrows;

Fig. 18 is a fragmentary view of a glossing roll provided with an embossing surface; and Fig. 19 is a diagram showing means for synchronizing the drives of the calender and glossing rolls.

*Preferred materials employed in the process*

In the preparation of colored plastic products by means of the present invention, it is preferable to employ a composition which is thermoplastic and contains no material that requires drying, curing or vulcanization to condition it. Coloring materials preferably in solid, finely divided form are mixed with sufficient binder consisting preferably of a plasticized, thermoplastic, elastomeric polymer to render a sheet prepared therefrom, solid and compact, and yet flexible or pliable, resilient, and elastic. The materials are preferably such as will require no addition of volatile solvent or moistening agent to facilitate distribution of the coloring material in the plastic.

The thermoplastic, elastomeric polymers employed in the present invention are preferably vinyl polymers in the high molecular weight range. Preferred among the latter are the polymers of vinyl chloride, vinyl acetate, vinyl butyral, and copolymer of vinyl chloride, vinyl acetate, A copolymer which has proven satisfactory is one prepared from 93 to 95 percent vinyl clhoride and the balance vinyl acetate, with an average molecular weight of approximately 24,000 as determined by the Staudinger method, and having a specific gravity of about 1.34 to 1.37, and softening at approximately 150° F. These above-mentioned polymer materials, when formed for present purposes, require no chemical or other treatment except preferably the addition of a plasticizer.

Plasticizers are employed which are compatible with these polymers, and which contain no constituents that are, as in the case of the polymers, reactive with atmospheric oxygen in the range of atmospheric temperatures. Examples of such plasticizers are tricresyl phosphate, dioctyl phthalate, dicapryl phthalate, dibutyl sebacate, dibutoxyl ethyl phthalate, dibutoxyglycol phthalate, polyethylene glycol di-2-ethyl hexoate, triethyleneglycol di-2-ethyl hexoate and the like.

Pigments or fillers employable are, for example, asbsestine, barytes, calcium carbonate, calcium sulfate, clay, dolomite, mica, silica, slate flour, serpentine talc. Synthetically prepared pigments and natural pigments and others, including chrome green, chrome yellow, carbon black, titanium dioxide, are used for providing solid colored or variegated plastic products referred to herein. Dyes miscible or immiscible with the resins may, in certain instances, also be used.

Fibers, such as asbestos, cork, wood flour, cellulose fibers in general, and others, including animal fiber, such as leather, may be added.

The particle size of pigments or fillers should be such that they will preferably pass through a 325 mesh screen. Fibers, if employed, as for instance, wood flour, should pass through a 50 mesh screen, though finer grades can be used. Asbestos fibers, namely, "shorts," pass completely through a 10 mesh screen.

Traces of lubricants such as stearic acid, and metallic stearates, and of stabilizers such as basic lead carbonate, basic lead silicate, and basic lead stearate are generally added to the mix.

A mix for preparing a desirably colored plastic material contains substantially 50% to substantially 75% by weight of filler material, including color pigment alone or both pigment and fiber. These limits are varied not more than one to five percent. A ratio of pigment filler to fibrous filler that is particularly desirable for floor and wall covering, is two parts by weight of pigment to one part of weight of fiber. Preferably not more than 50% of fiber is used in the mixed filter, thoroughly and uniformly distributed.

Mixes for preparing colored sheets contain in parts by weight from about 16 to about 38 parts of the polymer, about 7 to about 18 parts of the plasticizer, and about 50 to about 75 parts of filler. Optimum proportions for wear surfaces are about 23 parts of polymer, about 12 parts of plasticizer, and about 65 parts of filler. A compounded sheet containing the various pigments and fillers in the proportions stated has a preferred specific gravity of 1.85 to 1.90. Depending on the types of fillers and to some extent the proportion thereof, the specific gravity may be as low as 1.5.

A number of complete formulae of mixes are set forth in Patent No. 2,558,378 which resulted from my application S.N. 722,291, filed January 15, 1947. Though specific proportions of materials are stated above, such proportions are variable in the present process depending upon the effects desired and the use of the final product.

Compositions of the character aforesaid which comprise a thermoplastic vinyl resin and a filler are referred to herein and in the claims for the sake of brevity as vinyl plastic composition, and sheets, particles and the like made therefrom are similarly referred to as vinyl plastic sheets, vinyl plastic particles, etc.

*General process and arrangement of apparatus*

In order that the features of this invention may be more readily understood in connection with the following more detailed description thereof reference will first be made to the flow diagram shown in Fig. 1 which illustrates a typical arrangement of apparatus and sequence of steps involving said features and in connection with which said features may be utilized by which sheets are made from thermoplastic composition which may be of plain or solid color, although certain features of this invention are of special applicability to the production of sheets of variegated color.

The thermoplastic composition such as a vinyl plastic composition is mixed in the mixer 1 at a temperature at which it is of plastic and workable consistency. The mixed composition is passed from the mixer 1 to the sheeter 2 by which it is formed into a sheet while of moldable heat plasticized consistency. The resulting sheet, as will be described more in detail below, is comminuted or reduced to particles or granules by reducing means exemplified by the so-called scratcher or gouging roll 3 adapted to gouge moldable heat plasticized particles from the sheet.

The particles or granules by means of a heated conveyor 4 are conveyed to the calender 5 by which the heated granules are formed into a continuous sheet.

It a sheet of variegated color is desired plastic composition particles or granules of a different or contrasting color, one or more, may be separately and similarly prepared by means of the mixer 7, the sheeter 8 and the scratcher roll 9. These particles or granules of a different or contrasting color are commingled with the particles or granules produced by the scratcher roll 3, preferably by feeding them at a regulated rate by heated conveyor means 10 so as to be commingled with the particles or granules produced by the scratcher roll 3 as they are formed. In such case the resultant commingled particles constituting a mixture of variegated color imparted by the particles of different color are passed to the calender 5 by the heated conveyor 4 and the sheet 6 formed by the calender 5 will be of variegated color having a so-called jaspe appearance.

If desired the mixture of variegated color in the form of a jaspe sheet 6 can be marbleized by cutting the jaspe sheet into lengths by suitable means such as the guillotine cutter 11 and cross-calendered by the calender rolls 12. Before calendering, the lengths cut from the jaspe sheet, before or after transportation on the heated conveyer 13, are turned at right angles by any suitable means 14 and are lapped by any suitable means 15. The turned and lapped lengths are fed on a heated conveyer 16 to the calender 12 which welds the lengths to form a continuous sheet, which, by the action of the calender rolls during cross-calendering, is of variegated color having a marbleized appearance.

The marbleized sheet resulting from the foregoing is preferably next subjected to an operation adapted to improve the surface finish of the sheet by means of the glossing or polishing roll 17 after which it is cooled on the cooling drums 18. The sheet is then ready for immediate use and, if desired, may be wound into roll form for storage by the winder 19. The finished sheet, may if desired, be laminated with a supporting base such as asphalt saturated flooring felt, burlap, cotton duck, etc. If the polishing roll 17 is not used the sheet may be passed directly to the cooling drums 18. Alternatively if the sheet is not marbleized the continuous sheet produced by the calender 5, when either of the jaspe type or of plain color, may be passed from the calender 5 to cooling drums or may be passed from the calender 5 to the polishing roll 17 and thence to the cooling drums.

*Detailed description and exemplification of invention*

Certain of the features and advantages of this invention will now be described and exemplified in greater detail in connection with Figs. 2 and 11 inclusive and in connection with the employment of a thermoplastic composition such as a vinyl plastic composition of the character hereinabove exemplified. During processing the composition is maintained under controlled temperatures, which for certain steps is relatively high, the composition remaining moldable at the temperature prevailing during the steps, while preferably avoiding employment of temperatures so high that the composition employed when molded will not retain its shape. For obtaining uniform results accurately maintained temperature controls are important, and for obtaining desired effects control of temperature and maintenance of certain temperature differentials are also important both from the point of view of operativeness and the appearance of the product especially in the case of the production of products of variegated color. A vinyl plastic composition such as hereinabove exemplified can be conveniently mixed and sheeted while maintaining the temperature thereof uniformly above 300° F. and while certain of the features of this invention may be practiced while maintaining such elevated temperatures the temperatures occurring in various steps may range above or below 300° F. and maintenance of certain temperatures and temperature differentials is highly important in the production of certain products according to this invention as will more fully appear hereinbelow.

The ingredients of the thermoplastic composition are charged into a mixer 20, such as a Banbury mixer which is of suitable heavy construction and is provided with means for controlling the temperature of the materials being mixed therein. In the case of preferred vinyl plastic composition of the character aforesaid the temperature of the charge is in the approximate range of about 325° F. to about 375° F. although a somewhat lower mixing temperature down to about 300° F. may be employed in the case of such vinyl plastic compositions which employ a relatively soft vinyl resin or a relatively high ratio of plasticizer to vinyl resin. The materials charged into the mixer may be in their original raw condition, or may include reworked scrap, or all or a portion thereof may be preblended. A typical mixing temperature for a vinyl plastic composition having good all around properties for use as a floor covering is approximately 350° F. The mixing temperature is that temperature at which the ingredients become commingled under the influence of the mechanical mixing action to form a substantially heat plasticized workable mass which is substantially homogeneous in the sense that the ingredients are substantially homogeneously interdistributed. The mixing temperature is determined both by the steam pressures employed in heating the mixer, and by the larger amount of heat which results from the internal friction developed in the material itself during the mixing operation. Well known means (not shown) are provided for accurately controlling the mixing temperature, and to make known to the operator the actual temperature of the material during mixing and at the time discharge. The temperature of the discharged stock is preferably maintained substantially constant. The mixing temperature desired is attained immediately prior to discharge of the mass and when the conditions have been attained at which the resin has all become fused and homogeneously blended with the other ingredients. This usually requires a mixing period of about 4 to 10 minutes depending on such factors as the rate at which the mixer is operated, the amount of heat supplied thereto and the size of the batch. The mixing temperature attained should be sufficiently high to obtain such fusion and homogeneous blending but excessive temperature development may result in degradation of the vinyl resin. In order to avoid over-heating of the charge, it should be discharged from the mixer when the desired mixing temperature is attained.

The next step in the operation is to convert the hot plastic mass produced in the mixer into discrete heat plasticized particles or granules of moldable consistency, and certain of the features of this invention relate to the method and apparatus whereby this result has been successfully accomplished. This conversion of the hot plastic mass to heat plasticized particles or granules involves the carrying of a hot sheet formed from the hot plastic mass in firmly adherent relation to the surface of a rotating roll and the gouging of the particles or granules from the hot sheet while so carried by the rotating roll. These operations will now be illustratively described in greater detail.

The hot plastic mass after having been mixed in the Banbury mixer is discharged therefrom onto a two roll mill or sheeter which comprises the rolls 21 and 22, and the operation is carried out so that a supply of hot plastic mass is maintained for continuously feeding the sheeter. The rolls of the sheeter preferably are in a horizontal position as shown so as to facilitate the feeding of the hot plastic mass therebetween, and can be adjustably spaced to provide any desired thickness of sheet. These rolls are driven by a variable speed motor (not shown) and are geared so that the roll 22 revolves preferably at a greater peripheral speed than that of the roll 21. Moreover the roll 22 is preferably maintained at a substantially higher temperature than that of the roll 21, the rolls 21 and 22 being heated as with steam so that their respective temperatures may be controlled and so that plastic sheet temperature can be likewise controlled and regulated. When the mixing temperature is in the above mentioned range the temperature of the mixing rolls, and especially that of the mixing roll 22 on which the sheet is carried after its formation, should be in the same range. For example, temperatures for the mixing rolls in the approximate range of 325° F. to 350° F. are suitable, although a somewhat lower temperature for the roll 21 of approximately 300° F. may be employed. The heat of the mixed composition when discharged from the mixer as supplemented by the heat supplied to the rolls and the heat generated by internal friction during the sheeting operation serves to maintain the temperature of the composition so that it preferably does not fall below the mixing temperature and may be somewhat higher than the mixing temperature, as the sheeted composition is carried on the surface of the roll 22. Maintenance of such temperature conditions is highly important in order that the sheeted composition will firmly adhere to the roll 22 and will possess proper consistency for conversion into particles or granules by gouging them from the sheet while it is carried on the surface of the roll 22; and the fact that heat plasticized particles or granules can be successfully produced in the manner described if these requisite conditions are maintained is a significant feature of this invention. When the proper controls were not maintained the operation was inoperable due to such occurrences as the sheet becoming stripped wholly or in chunks from the roll 22 when attempt was made to gouge the particles or granules therefrom and there was resultant fouling and complete failure to obtain particles or granules in a usable condition. By way of a further more specific example when the mixing temperature is approximately 350° F. a temperature of about 350° F. or somewhat above for the roll 22 and the stock temperature of the sheet formed and carried thereby provides good operating conditions. However, the temperature control can be varied within the aforesaid temperature range of 300° F. to 375° F. depending principally on the particular composition formulation that is processed. More generally it is preferable to employ as high a temperature for the sheeting operation and for the gouging of particles from the sheet as is consistent with minimizing degradation of the vinyl resin component of the composition. This is opposed to conventional practice in the sheeting of such compositions wherein the temperatures employed are those at which the plastic material readily leaves the sheeting rolls rather than adhering firmly thereto. By utilizing inherent characteristics of the compositions whereby under the temperature control conditions maintained whereby the formed sheet remains firmly adherent to one of the sheeting rolls, the coaction between the sheet, the roll on which it is carried and the action of the gouging members is such that the particles or granules are effectively produced.

Figure 8:
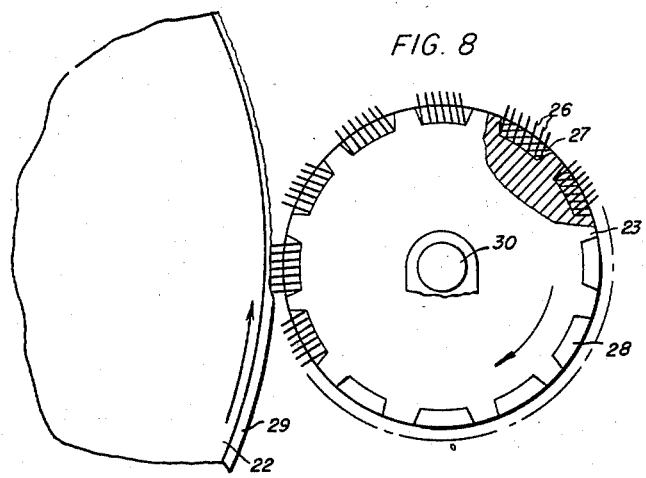
Figs. 8, 9 and 10 are views showing details of a so-called gouging or scratcher roll employed in the apparatus.
Figure 9:
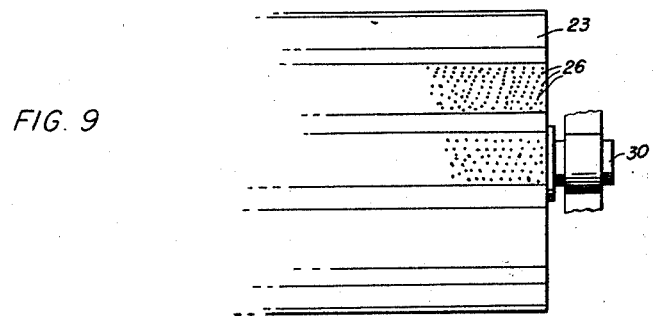
Figure 10:
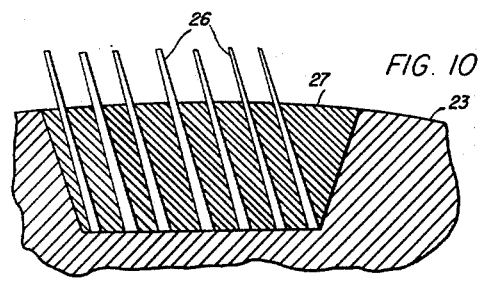

In producing the heat plasticized particles or granules by gouging them from the sheet which is formed between the rolls 21 and 22 while the sheet, under the temperaturec onditions above mentioned, is carried by the roll 22 in firmly adherent relation thereto, the gouging is performed using the gouging or scratcher roll 23 which is preferably housed in the enclosure 24 that is provided with a transparent or sliding door 25 through which the operations may be observed. As shown in Figs. 8, 9 and 10 the scratcher roll 23 consists of a roll having numerous spikes, teeth or gouging pins 26 projecting from and distributed in fixed position as on 1 inch centers over the surface thereof. The spikes or pins 26 are removable and may be variously spaced and inserted in staves 27 which fit into axially extending recesses 28 in the surface of the roll 23. The roll 23 is adjustably movable toward or away from the surface of the roll 22 and is set so that the pins 26 or other gouging members can gouge out particles of desired size of the plastic composition from the sheet 29 as it is carried in inherent relation on the surface of the roll 22. The roll 23 revolves on its axle 30 in a direction opposite to that of roll 22 as shown by the arrows in Fig. 8 so that the gouging members move in the same direction as the travel of the sheet 29 on the roll 22. The scratcher roll is separately driven by a variable speed motor (not shown) so as to maintain a surface speed differential between the roll 23 and the coacting sheeter roll 22 which can be varied at will. The scratcher roll in maintained at a higher peripheral speed than that of the roll 22 and the speed differential between these rolls preferably is at least about 25 or more to 1 so as to facilitate clean separation of the particles gouged from the sheet by the gouging members. Most of the sheet 29 is converted to the particles or granules by the action of the gouging members and any plastic material remaining adherent to the roll 22 will return to the nip between the rolls 21 and 22. In this manner the hot plastic composition can be successfully converted into discrete particles or granules under the controlled conditions hereinabove described. Since the composition is mixed and formed into a sheet which is carried on the roll 22 while maintaining the temperature controls aforesaid it is apparent that the particles or granules as initially produced are within the aforesaid temperature range, and preferably at a temperature which is not substantially below the mixing temperature.

The size of the granules produced by the scratcher roll depends largely on the thickness of the sheet produced between the rolls 21 and 22, the speed at which the scratcher roll is operated, the relative surface speeds of the scratcher roll and the coacting sheeter roll and the depth or penetration of the pins 26 or other gouging members into the body of the sheet 29. The pins 26 or other gouging members preferably are not pointed but are slightly tapered toward a flat outer tip. Moreover, they are preferably positioned so as not to extend diametrically outwardly but at an angle approximately 25° to the diameter of the roll 23 and downwardly on the upwardly moving side of this roll. The clearance between the tips of the pins 26 and the metal surface of the roll 22 preferably is not less than about .02 inch, and is less than about .25 inch.

Further features of this invention are concerned with the formation of the heat plasticized particles or granules in relation to subsequent calendering and to the relative conditions under which these operations are carried out. While the heat plasticized granules are preferably produced as above described and improved products are obtained when this is the case, the further features and advantages of this invention hereinafter described may also be realized if the heat plasticized particles or granules are produced in some other way.

In the manufacture of a plain or solid color sheet the particles or granules immediately on their production are collected, after falling in discrete condition through the atmosphere in the enclosure 24, on and adjacent the end of the heated conveyor 31, and they are continuously moved out the enclosure 24 at a controlled rate by the conveyor 31 to the upper rolls 32 and 33 of a four roll calender. The provision of means for supplying the particles or granules at a controlled rate is an important factor in obtaining desirable and uniform products. It will be noted that the rolls 32 are on about the same level and rotate toward each other at their upper surfaces so as to receive the granules 41 (Fig. 2), the space above and between them serving as a hopper for the particles discharged from the conveyer 31 as the particles are formed into a continuous sheet between the rolls 32 and 33.

The entire length of the conveyer 31 is preferably heated to maintain the particles at a temperature which is approximately the same as that of the particles as initially formed. Thus if the particles are initially formed at a temperature of about 325° to 350° F. the particles are maintained on the conveyor at a temperature within this range. The conveyor may be heated electrically or by circulating hot gases through the ducts 32 and through a heat insulated enclosure 35. In Fig. 7 the advancing portion 36 and the return portion 37 of the conveyor 31 are shown supported on rollers 38 movable on upper and lower tracks 39 and 40 respectively.

In the case of the formation of a sheet of plain or solid color the stock temperature of the particles or granules during calendering between the rolls 32 and 33 may be substantially the same as the stock temperature during the mixing and particle formation steps and the temperature of the rolls 32 and 33 may be controlled so as to maintain such stock temperatures. As aforesaid, the stock temperatures may be within the aforesaid range of 300° to 375° F. and, more particularly, if the plastic composition is mixed at a temperature of about 325° to 350° F. the stock temperature during calendering can be maintained within this temperature range. It is usually preferably to maintain the temperature of the roll 33 at a slightly higher temperature than the roll 32 and the temperature of the rolls may be maintained at approximately stock temperatures or somewhat below when a sheet of plain or solid color is being produced.

By the foregoing steps a method of producing a sheet of solid or plain color is afforded which has several decided advantages. The steps of hot mixing, forming the mixed composition into a sheet, converting the sheet to heat plasticized particles and the formation of the heat plasticized particles into a second continuous sheet on a calender to which the particles are fed, serves excellently for providing a sheet which is of uniform consistency throughout due to the improved commingling of the composition ingredients which result from the initial sheet formation and the conversion of the sheet initially produced to particles which are indiscriminately commingled and then reworked in being formed into the second sheet. Moreover, the composition material as thus supplied to the calender can be maintained under conditions of extremely uniform temperature throughout so that more uniform calendering is afforded. Likewise the supply of the composition to the calender in the form of heat plasticized granules more readily aids in the release of entrapped air, and extraction of foreign metallic particles from the plastic particles, as by use of magnetic separators, is readily made possible thereby preventing damage to the calender rolls. The operation is also one wherein continuous operation is made possible in a continuous manner due to the fact that the plastic mass as initially produced in a hot plastic and workable condition can be converted into particles without loss of heat whereby the particles as produced in the hot plastic condition may be immediately calendered.

The operations hereinabove described may be most advantageously employed in the production of a sheet of variegated color. In such case the granules which are formed into a sheet between the rolls 32 and 33 instead of all being the same color will be a predetermined mixture of particles or granules having different color. Thus heat plasticized particles having one color may be produced using the sheeter rolls 21 and 22 and the scratcher roll 23 as hereinabove described and heat plasticized particles or granules of a different or contrasting color may be introduced continuously and in controlled amount into the enclosure 24 from a hopper 42. The particles are introduced into the enclosure 24 from the hopper 42 so as to fall in discrete condition through the air within the enclosure 24 and they become commingled with the particles produced by the action of the scratcher roll 23 as the latter particles likewise are falling through the air. It is thus seen that the heat plasticized particles of different color are commingled while in essentially discrete condition in a gaseous atmosphere so that when the particles are collected on and are conveyed away by the conveyor 31 the particles of different color are uniformly distributed with each other as they are fed to the supply of particles 41 that is formed into a sheet by the rolls 32 and 33.

Figure 5:
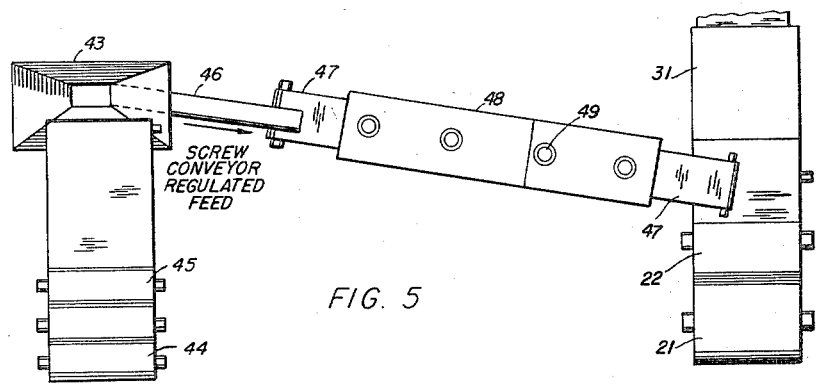
Figs. 5 and 6 are, respectively, diagrammatic plan and elevational views of apparatus for supplying pigmented or colored resin particles to the main chain of apparatus as hereinafter described.
Figure 6:
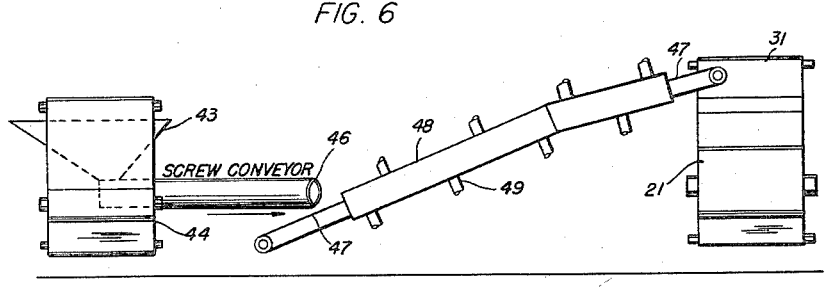

The particles in the hopper 42 are prepared in a manner similar to that employed in preparing the granules initially obtained in the enclosure 24. Ordinarily they are of essentially the same composition as the particles produced by the scratcher roll 23 except for difference in color, although this is not essential provided the particles of different color are compatible or miscible with each other. Referring to Figs. 5 and 6, depending upon the color combination desired in the final product, particles of desired color or colors are introduced into a hopper 43. The original materials are mixed in a heated mixer, and the mix formed in the mixer is converted into the particles fed into the hopper 43 in a manner essentially similar to that hereinabove described. Thus, the mix is deposited on the sheeter 44 which forms the mix into a sheet as hereinabove described in connection with the sheeter rolls 21 and 22; and a scratcher or gouging roll 45, which is similar in construction and operation to the scratcher roll 23, converts the resulting sheet into particles or granules which are deposited in the hopper 43. The conditions of temperature during the operations of mixing, sheeting and reduction to granular or particulate form are the same as those hereinabove described in connection with mixer 20, the sheeter rolls 21 and 22 and the scratcher roll 23.

The particles which are deposited in the hopper 43 are fed therefrom into a screw conveyor 46. The screw conveyer 46 deposits the particles on a heated conveyer 47 which is similar in construction and operation to the conveyor 31 and which is provided with an enclosure 48 having ducts 49 for heating gas, these parts being similar to the enclosure 35 and the ducts 34 respectively associated with the conveyer 31. The particles are deposited by the conveyer 47 in the hopper 42 from which they are fed into the enclosure 24 to be mixed with the granules provided by the scratcher roll 23 in the manner above described. The apparatus shown in Figs. 5 and 6 is continuously operative and provides granules at any rate needed into the enclosure 24 to provide a desired proportion of particles which are of a contrasting or different color as compared with the particles produced by the scratcher roll 23. A supply of such particles of contrasting color may be kept on hand or such particles may be prepared continuously and supplied at the required rate by adjusting the speed of delivery of the screw conveyer 46. Preferably the conveyer 47 operates at a fixed speed so that all the granules are heated for the same length of time. By increasing or decreasing the amount of colored particles deposited by the conveyer 46 on the conveyer 47 the amount of particles of such color delivered to the main production line can be varied as desired.

While the mixture of particles of different color as fed to the nip between the rolls 32 and 33 may be at a temperature within the range hereinabove mentioned, it is preferable in the production of a sheet of variegated color that the granules as fed to the rolls 32 and 33 be at a somewhat lower temperature, namely, in the approximate range of 275° to 325° F. It is desirable that the particles of different color all be preheated to substantially the same temperature for being fed to the calender rolls 32 and 33.

The temperature of the composition as it is calendered between the rolls 32 and 33 may be in the range above indicated for the production of a sheet of solid color. However, better color definition is afforded in the production of a sheet of variegated color when the composition during calendering is maintained at somewhat lower temperature, namely, in the approximate range of 250° F. to 325° F. Thus, the temperature of the composition is preferably from about 25° to about 75° below the mixing temperature of the composition and the temperature of the composition as initially converted into the form of particles or granules. Likewise for providing improved color definition it is desirable that the temperature of the calender rolls be maintained substantially below the temperature of the composition as it is formed into a sheet from the particles supplied to the calender rolls. For example, the calender roll 32 may be maintained at a temperature in the approximate range 175° to 190° F. while the calender roll 33 may be maintained at a temperature in the approximate range of 200° F. to 250° F. In such case the lower roll temperatures maintained will serve to cool the composition as it undergoes calendering so as to be substantially below the mixing temperature as above mentioned. Preferably the roll 33 is operated at a peripheral speed somewhat in excess of that of the roll 32, but this is not essential.

The calender rolls 32 and 33 of the four roll calender shown exercise the primary sheet forming and calendering functions. However the rolls 50 and 51 of the calender may also be employed so that the calender subjects the composition to three different calendering operations. In any case the effect of the calendering is to produce a sheet of variegated color in the form of streaks having a jaspe appearance. When the mixture of particles having different color is supplied to the rolls 32 and 33 by the conveyer 31, the action of the rolls 32 and 33 is to form the particles into a continuous sheet having a jaspe appearance wherein the streaks are relatively short. By also passing the sheet between rolls 33 and 50 the sheet is further solidified and the streaks formed by the rolls 32 and 33 are further elongated. This action is accomplished by a slight reduction in the thickness of the sheet and by maintaining a small differential between the surface speeds of the rolls 33 and 50. The sheet may be still further reduced in thickness by a pass between the rolls 50 and 51 which also have a surface speed differential thereby effecting further elongation of the streaks. For most purposes passage of the mixture of variegated color imparted by the particles solely between the rolls 32 and 33 produces a sheet of desirable color variegation in the form of jaspe streaks. In such case by adjustment of the position of the rolls 50 and 51 or by by-passing these latter rolls as shown in Fig. 12 the calendering effect of one or both of the rolls 50 and 51 may be omitted. In Fig. 2 all four rolls of the calender are shown in operation. Alternatively it is possible to use the rolls 32 and 33 for calendering and the rolls 50 and 51 as cooling rolls. The use of the rolls 50 and 51 as cooling rolls is particularly suitable in those cases when it is desired to produce a finished sheet having either a solid or plain color or having variegated color of jaspe appearance.

Further features of this invention relate to a cross-calendering operation which, if desired, may follow the operations hereinabove described. The cross-calendering operation is of particular utility in the production of a sheet of variegated color having marbleized appearance from a jaspe sheet which has been produced as hereinabove described. However, the steps used in the cross-calendering operation may also be employed in connection with the production of sheets of a solid color so as to obtain further uniformity in a thinner sheet or in connection with jaspe sheets produced by operations other than those hereinabove described.

If the cross-calendering operation is to be performed, the following steps are illustrative of the practice thereof according to this invention. The continuous sheet formed by the calendering of the heat plasticized particles or granules is continuously delivered onto and by the conveyer 52 to a guillotine cutter 53 whereby the sheet is cut into short lengths 54 (Fig. 3) which are continuously delivered on rollers 55 to a heated conveyer 56 which is constructed and operated similarly to the conveyer 31 and is similarly enclosed in an enclosure 57. The cutter 53 is automatically controlled by a roller 58 so that the lengths 54 will be of the proper longitudinal dimension depending on the width desired for the ultimate sheet product. Edge trimmers (not shown) are also provided to obtain the desired lateral dimension of the lengths 54. If the finished sheet is to have a width of 6 feet, for example, the cutter 53 provides lengths of about 6½ feet to permit trimming after cross-calendering. The material on the conveyer 52 and on the rollers 55 may be kept at desired high temperature as, for instance, above 300° F., by means of auxiliary heat applications. As indicated below, however, or in modified processes, these auxiliary heat applications may be omitted if desired.

For maintaining the lengths 54 in a heated condition while travelling on the conveyer 56 heating gas such as air may be introduced into the enclosure 57 through an inlet manifold 59 and withdrawn through an outlet manifold 59a. A closed system for circulating heating gas in the enclosure 57 is provided by connecting the manifold 59a to a heat exchanger 60 from which heating gas is in turn drawn through an electric heater 61 by means of a fan 62 which is connected to the manifold 59. The circulating gas is heated in the heat exchanger 60 by a closed coil through which steam under pressure passes to raise the temperature of the gas coming from the conveyer. Further elevation of temperature is effected in the electric heater 61. The steam pressure in the coil in the heat exchanger 60 is controlled automatically and is dependent on the temperatures desired in the enclosure 57. The electric heater 61 is controlled thermostatically. By such controlled heating means the short lengths 54 can be rigidly maintained at a desired relatively high temperature. For example, the lengths may be maintained at a temperature within the range from about 150° F. to about 250° F. For continuous operation as presently described maintenance of the lengths at a temperature of 200° F. to about 250° F. is usually desirable. In a discontinuous method as illustrated in connection with Fig. 12 the lengths may be fed to the marbleizing calender at a somewhat lower temperature as, for example, in the range from about 150° F. to about 200° F. For most purposes in the production of marbleized sheets from a jaspe sheet it is desirable to feed the sheets into the calender which performs a cross-calendering operation at a temperature of about 200° F. to about 250° F. However, somewhat lower temperatures may be employed, preferably above 180° F. and for certain types of operation a jaspe sheet may be preheated prior to cross-calendering so that the top surface thereof is about 220° F. to 250° F. while the bottom surface thereof is about 170° F. to 220° F.

The equipment for heating and circulating the heating gas used in connection with the conveyer 56 and the automatic temperature control for setting the temperature at any given point or range may be used in connection with the conveyers 31 and 47.

Upon discharge from the conveyer 56 the short lengths are turned at right angles either mechanically or by hand. The lengths as shown at 65 are then lapped consecutively at the edges that were previously at the side edges of the sheet on the conveyer 52. The lengths as thus lapped are continuously and consecutively fed at a right angle to the jaspe streaks between the calender rolls 66 and 67 and then between the calender rolls 67 and 68. Positioned immediately ahead of the rolls 66 and 67, for maintaining the lapped sheets preheated directly and substantially to the point of feed to these rolls, is an enclosed heating means 70. Within this heating means as shown in Fig. 11 is an endless conveyer 71 for feeding the lapped sheets 65 to the calender at a rate that is controllable by an operator and that conforms to the demand of the calender. The sheets on the conveyer 71 are heated by electric radiant heaters 72 positioned above and below the lapped sheets 65. A vent 73 is provided for the escape of vapors. The circuits for the heaters 72 are controlled and are adjustable to provide the required temperature. This required temperature is then maintained within the range hereinabove mentioned with reference to the heating of the lengths while carried on the conveyer 56 so that the lapped lengths will be fed to the rolls of the cross-calender within the temperature ranges hereinabove stated.

The pass of the lapped sheets between the rolls 66 and 67 serves to reduce the thickness of the sheet material introduced therebetween and to weld the lapped lengths together to form a continuous sheet. For producing a marbleized effect from a jaspe sheet the jaspe sheet material which is fed into the cross-calender is generally from two to five times the thickness of the finished sheet produced by the cross-calendering. For example, a jaspe sheet about .05 inch in thickness may be reduced to a marbleized sheet about .025 inch in thickness. As shown in greater detail in Fig. 13 a bank 67a of composition is maintained immediately in advance of the nip between the rolls 67 and 68. This bank is preferably maintained so as to be from about 1 inch to about 1½ inch in diameter and so as to be of equal size across its entire length. A bank of such size has been found to provide a marbleizing effect having the most desirable pattern appearance. The rate of sheet feed into the calender and the spacing of the calender rolls is preferably maintained so as to maintain a bank of the size mentioned. In the bank the material innerfolds upon itself and breaks up the color streaks of the jaspe sheet into a mottled design having the desired marbleized pattern effect.

It is an important aspect of this invention that critical conditions of temperature control be maintained whereby a satisfactory marbleized sheet may be produced. Suitable temperatures for calendering may be within the range from about 180° F. to 290° F. although for certain compositions a higher calendering temperature up to about 300° F. may be employed. For most purposes a calendering temperature within the range of about 250° F. to about 290° F. is desirable. It is also important to maintain a temperature differential between the different rolls comprised in the calender used for cross-calendering. For example, the roll 66 is maintained at a temperature of about 180° F. to about 200° F. The roll 67 is maintained at a substantially higher temperature, namely, at a temperature between about 260° F. and about 290° F. The roll 68 is maintained at a temperature lower than the temperature of the roll 67, namely at a temperature of about 225° F. to about 260° F. While the foregoing temperature ranges applicable to the rolls 66, 67 and 68 have been found to produce desirable results the temperature of the roll 66, if desired, may be maintained within the temperature range above mentioned which is applicable to the roll 68. For example, very desirable results have been obtained when the rolls 66 and 68 were maintained at a temperature of approximately 245° F. while the roll 67 was maintained at a temperature of about 290° F. As above indicated the lapped sheets fed into the cross-calendering operation are preferably at a temperature substantially lower than the temperature at which the roll 67 is maintained. However, due to the fact that the sheet material is heated by the roll 67 on which it is carried, and due to the fact that heat is generated by internal friction particularly upon the passage of the composition between the rolls 67 and 68, the stock temperature of the sheet material as it emerges from the calendering operation may be approximately the temperature at which the roll 67 is maintained. Thus, in connection with the foregoing example wherein the roll 67 is maintained at a temperature of about 290° F. the stock temperature of the composition as it passes between the roll 67 and the roll 68 will likewise be about 290° F.

Under ordinary circumstances calendering of a thermoplastic composition such as a vinyl plastic mix is accomplished at substantially the mixing temperature thereof. Thus, if the mixing temperature is of the order 325° F. to 350° F. sheet formation by calendering is conventionally effected at like temperature, for the consistency of the composition at the temperature appropriate for the mixing is normally regarded as best suited for calendering the composition. The practice of this invention as above described constitutes a departure from such conventional calendering practice and it is to be noted as being of critical importance in the practice of this invention for the production of marbleized sheets that a substantial temperature differential be maintained so that the calendering temperature will be substantially below the mixing temperature and below the temperature at which the mix is initially sheeted and converted into granules. Thus, when the mixing temperature and that of initial sheeting and granule formation is in the aforesaid range of about 325° F. to about 350° F. and the maximum calendering temperature of the composition is as aforesaid about 290° F. or 300° F. it is apparent that the temperature differential maintained is at least 25° F. and preferably at least 35° F. If the maximum mixing temperature of about 375° F. for such composition is employed, and the aforesaid maximum calendering temperature of about 290° F. or 300° F. are employed, the temperature differential maintained is of the order of 85° F. or 75° F. respectively. Even greater temperature differentials may be utilized if the aforesaid maximum mixing temperature and the aforesaid minimum calendering temperature are employed, but for most purposes the maintenance of a temperature differential of about 25° F. to about 85° F. affords best results.

The temperature differential between the calendering temperature of thermoplastic compositions and mixing temperature of the compositions is roughly paralleled by the temperature differential maintained between the mixing temperature and maximum calender roll temperature, namely, the temperature of the calender roll that is maintained at the highest temperature. This temperature differential is apparent by comprising the aforesaid mixing temperature range of about 325° F. to about 350° F. with the aforesaid calender roll temperature of the roll 67 of about 260° F. to about 290° F., which latter temperature are from 65° F. to 35° F. below the mixing temperature of 325° F. and from about 90° to about 60° F. below the mixing temperature of 350° F. Such temperature differentials ranging from about 35° F. to about 90° F. represent good practice, both as regards mixing temperatures of the range 325° F. to 350° F. and as regards the broader mixing temperature range of 300° F. to 375° F. However, in the case of a mixing temperature of about 375° F., it is apparent that the temperature differential would be as great as about 115° F. if the roll 67 is maintained at about 260° F.

With regard to the temperature of the cooler calender rolls which contact the surface of the calendered sheet opposite to the surface which contacts the roll 67, a very substantial temperature differential in relation to the mixing temperature is maintained. Thus in relation to the aforesaid mixing temperature range of 325° F. to 350° F. the maximum temperature of the roll 68 is 65° F. below the minimum mixing temperature of 325° F. while the minimum temperature of 225° F. of this roll is 125° below the mixing temperature of 350° F. Even greater temperature differentials as compared with mixing temperatures are applicable to the roll 66 when it is maintained at the aforesaid temperature of the range 180° F. to 220° F., namely about 170° F. or as much as 195° F. in the case of a mixing temperature of 375° F.

By thus maintaining the calender roll surfaces in contact with at least one of the surfaces of the calendered sheet at a temperature substantially below the mixing temperature, greatly improved results are afforded as regards pattern effect and color definition and distinctness in a sheet that has good surface characteristics, and this is especially the case when the calender roll surface in contact with one of the surfaces of the finished calendered sheet is many degrees below the mixing temperature and is of the order aforesaid. However, while too high calendering temperatures tend to result in blending or smearing of the colors, the conditions afforesaid afford better results than if very large temperature differentials are maintained between the stock temperature and the temperature of the calender rolls.

It is also to be noted that the roll 67 is maintained at a higher temperature than either of the rolls 66 or 68. This temperature differential between opposed calender rolls is important in that it increases good adhesion of the sheet to the roll 67 during the calendering operation, whereby entrapment of air is avoided as the sheet passes between rolls 67 and 68. Such adhesion is also preferably promoted by rotating the roll 67 at a somewhat greater speed as compared with that of the roll 66, although this is not essential. As aforesaid, the lapped sheets are fed into the cross-calendering operation at a temperature of about 200 F. to 250° F. or even at a lower temperature in the case of discontinuous operation. Such feeding temperatures are below the temperature of the roll 67 and this is desirable so as to offset the heat generated during calendering so that the composition during the cross-calendering will not attain a temperature substantially in excess of that of the roll 67 or above the aforesaid calendering temperature of the composition. However, the composition as carried by the roll 67 does attain a temperature substantially in excess of that of either of the rolls 66 or 68 as it passes between the rolls 67 and 68 and it is important to maintain the surface of the sheet opposite to that in contact with the roll 67 in contact with the calender surface at a temperature substantially below that attained by the composition during the calendering operation. When as above exemplified the calendered composition attains a temperature of about 290° F. the temperature maintained for the calender surface in contact with one surface of the composition while at said temperature is preferably that above mentioned for the roll 68, namely, about 30° F. to about 65° F. below the composition temperature.

The temperature of the rolls 66, 67 and 68 is separately maintained, preferably automatically, so as to maintain the required roll temperature for each roll as by regulation of appropriate media, such as steam or water circulated through the rolls. The rolls operated at the lower temperatures may have to have heat dissipated therefrom while for maintenance of higher temperatures heat may be supplied and controlled as by regulation of steam pressure used to heat the rolls. The amount of heat generated because of internal friction in the composition during calendering will vary depending largely on the calendering speed and the amount of reduction in sheet thickness, and the means for regulating the temperature of different calender rolls are adjusted depending on the particular operating conditions so as to maintain the aforesaid temperatures and temperature differentials. In practice a suitable production rate of the calendered sheet is about 25 to about 40 linear feet per minute.

While the foregoing respecting the temperatures maintained during calendering are especially important to the successful production of a marbleized sheet according to this invention having satisfactory combined properties of color definition and surface smoothness, the foregoing respecting the relationship of the calendering temperatures of both the composition and calender rolls relative to the temperature at which the mixing and granule formation steps are carried out, is likewise applicable to the calendering operation whereby a jaspe sheet is produced by calendering between the calender rolls 32 and 33, especially when the jaspe sheet is to be the finished product. Whether the plastic composition is fed between calender rolls in the form of discrete particles or granules of different color or in the form of a jaspe sheet wherein the particles have been unified into a coherent sheet while retaining their individual contrasting colors, the composition undergoing calendering is to be regarded as a mixture of variegated color imparted by the different colored particles, and when such a mixture is subjected to calendering either for the production of a jaspe sheet or for the production of a marbleized sheet, the improvements afforded according to this invention are obtainable when the aforesaid controlled relationships are maintained.

After the calendering of the sheet has been completed as hereinabove described the sheet is stripped from the roll 68 and is then cooled as by passing it over a series of cooling drums 74 (Fig. 4). Edge trimmers (not shown) are provided to trim the sheet to the desired width. The sheet is cooled preferably to about 50° to 100° F. so that it can be easily handled without distortion or damage. The finished sheet may then be wound in rolls on the winder 75 and it is then ready for use or for packing and shipment. The resulting sheet material may be laminated with a supporting base in the usual manner especially when the product is to be sold as floor covering, the sheet material for such uses preferably having a thickness less than about 1/16 inch.

While this invention may be practiced in the production of a marbleized sheet in a continuous process in the manner and using the apparatus hereinabove described it is also possible to carry on the process in a discontinuous manner between the formation of the jaspe sheet and the cross-calendering to produce a marbleized sheet by the means shown in Fig. 12. Thus, after the formation of a jaspe sheet and after cutting it into short lengths the lengths are placed in a pile 77 as shown in Fig. 12 instead of passing these lengths continuously from the cutter 53 to the conveyor 56. After the lengths have been placed in the pile 77 the lengths are taken from the pile 77 and fed to the heated conveyer 56. By means of this conveyer and by means of the heater 70 the lengths are brought to the proper temperature for the marbleizing step as hereinabove described. When this invention is practiced in this way no auxilliary heaters are found to be necessary for heating the sheet on the conveyer 52 and on the rollers 55. By utilizing the means shown in Fig. 12 the required operations can be carried out with greater flexibility particularly from the point of view of pattern changes and enabling the marbelizing calender to be operated on a continuous basis.

It is not essential that the marbleizing calender be in the form of the rolls 66, 67 and 68 as shown in Fig. 4. Thus a calender of the type shown in Fig. 2 may be employed as the marbleizing calender. In such case the lapped sheets would be initially integrated into a continuous sheet by passage between the rolls 32 and 33 and the principal marbleizing effect would be obtained at the nip between the rolls 33 and 50. In such case rolls 32, 33 and 50 would correspond with the rolls 66, 67 and 68 and would be maintained at the corresponding temperature hereinabove mentioned for the rolls 66, 67 and 68. The roll 51 could be maintained at about the same temperature as that of roll 50 or it could be used as a cooling roll or could be omitted.

While a sheet such as a marbleized sheet may be produced as hereinabove described which has improved characteristics further features of this invention relate to method and means whereby the surface finish of the sheet may be still further improved. Furthermore specific features of this invention also relate to the combination of the calendering operation with a glossing or polishing operation whereby a product having superior all around properties as regards color definition and surface gloss is afforded by calendering under conditions favorable to the maintenance of sharp color definition followed by a glossing or polishing step whereby the surface finish is improved without detracting from the sharpness of the color definition or otherwise adversely affecting or altering the calendered sheet. Prior to the present invention the obtainment of the aforesaid objectives had been consistently difficult to accomplish. The use of known burnishing and finishing means had resulted in certain complexities in operation with retardation in production and had also resulted in undesirable non-uniformities in the finished product.

The foregoing objectives and advantages have been successfully obtained according to this invention by means of relatively simple equipment and by operations which can be conveniently and economically carried out at a high production rate. The apparatus employed includes simple attachments to the calender roll equipment of the type usually available in plants producing continuous plastic sheeting. In a preferred arrangement the calender may have a smooth surface glossing or polishing roll mounted adjacent thereto so that the sheet after calendering can be passed directly from the calender to said roll. The calendered sheet as produced in a heat plasticized condition by the calender rolls is made to adhere uniformly to the smooth surface of the glossing roll under critically controlled relative temperature conditions whereby a gloss finish may be imparted to one surface of the calendered sheet before the calendered sheet is passed on to cooling rolls and if desired to a winding roll. Under preferred conditions a high gloss is avoided, the sheet being provided with a more desirable satiny or semi-gloss finish. The operations are synchronized including drives for the calender and for the glossing roll and they are carried out so as to avoid any undue or appreciable change in the thickness or sectional dimensions of the calendered sheet and so as to minimize the development of stresses in the heated sheet which would have the effect of causing dimensional instability in the finished sheet. If a film or sheet of vinyl plastic composition is stretched while in a heated condition after it is once formed and if the sheet is then cooled in the stretched condition the internal stresses developed tend to cause shrinking of the sheet extending over a long time when the sheet is at atmospheric or room temperatures. The operations as carried out according to this invention not only avoid development of such stresses in the finished sheet, but also tend to reduce or relieve any stresses which may have been imparted to the sheet during prior processing. However, the principal advantage resulting from the association of the glossing roll with the calender resides in the improvement in the gloss finish which is obtained; and provided the required temperature differentials between those prevailing during calendering and that of the glossing roll optimum characteristics are afforded as regards the sharpness and distinctness of color definition in the finished marbleized sheet in combination with a very desirable gloss finish which is particularly important when the resultant sheet is to be used for floor or wall covering purposes.

If desired the calendered sheet not only may be provided with an improved gloss finish but also, as part of the same operation, may be embellished with ornamentations such as bosses.

The means and method of this invention for providing an improved gloss finish may be advantageously employed as an integral part of the apparatus and method hereinabove described in connection with Figs. 1 to 12 whereby as the result of their further combination therewith the resulting product is additionally improved. Accordingly and for purposes of exemplification the glossing roll means for imparting the improved gloss finish has been shown in Figs. 13 to 19 in combination with the cross-calender and cooling roll means shown in Figs. 3 and 4, the glossing step performed thereby being a continuation of operations hereinabove described up to and including the cross-calendering step. After the lapped lengths 65 have been subjected to calendering by passage between the rolls 66 and 67 and between the rolls 67 and 68 the resulting calendered sheet 82, instead of being passed directly to the cooling rolls 74, is transferred after its passage between the calender rolls 67 and 68 so as to be immediately received on the surface of the polishing or glossing roll 78 which is adjacent the calender roll 68 and on which it is carried through a substantial distance of travel before being stripped therefrom. After the calendered sheet has been stripped from the glossing roll 78 it is passed to the cooling rolls 74 and thence, if desired, to a winder, as hereinabove described. The sheet retains the surface gloss imparted thereto after it has been cooled. Pressure rollers 79 and 80 are mounted adjacent the roll 78 for bringing the hot plastic sheet into close contact with the surface of the polishing roll and for promoting its intimate adhesion with the smooth surface of the polishing roll. The above mentioned rolls are horizontally mounted for rotation in the direction of the arrows and the glossing roll 78 and the pressure rollers 79 and 80, like the calender rolls 66, 67 and 68 are hollow or otherwise constructed so that gaseous or liquid media may be circulated therethrough for maintaining them at the requisite temperatures as will be more fully described hereinbelow.

A guide roll 81 is positioned adjacent the calender roll 67 so that a calendered sheet 82 coming from between the calender rolls 67 and 68 is guided in contact with and a substantial distance on the upwardly moving side of the clockwise rotating roll 67. The axes of the rolls 78, 79 and 80 are parallel to the axis of the guide roll 81 and to each other. The rolls 78 and 79 are positioned with respect to each other and with respect to the calender so that a calendered sheet from the roll 81 extends in contact with the roll 78 over a major portion of its counter-clockwise rotating cylindrical surface on its downwardly moving side and in contact with a lower portion of the counter-clockwise rotating cylindrical surface of the bottom calender roll 68 positioned between the roll 78 and the first cooling roll 74.

Though two pressure rolls 79 and 80 are shown, the roll 80 may be omitted if desired. Both rolls 79 and 80 are actuated by pressure applying means and are of such length as to apply uniform pressure along the full width of a calendered sheet 82 on the glossing roll 78.

The pressure applying means (details in Figs. 14 and 15) associated with each roll 79 and 80 at opposite ends thereof, comprises a pneumatic pressure cylinder 83 from one end of which projects a piston rod 84. The upper end of each cylinder 83 swings on a support 85. The outer end of each piston rod 84 is pivotally linked with one end 86 of a lever element 87. The other end 88 of each lever element 87 is pivotally supported on a bolt 89. The axes 90 and 91 of the pressure rolls 79 and 80, respectively, are supported at each end by an adjacent lever element 87 between the ends 86 and 88 thereof.

Since the distance, maintainable between the surface of the glossing roll 78 and the surface of a pressure roll 79 or 80 while the pressure cylinders 83 are in operation, depends on the thickness of the sheet 82, such distance can be varied by adjusting the position of each bolt 89 with respect to the roll 78. For this purpose, each bolt 89 is movable toward or away from the roll 78 in a slot 92 in a fixed plate 93 provided for each bolt, and can be held in a fixed predetermined position in said slot.

For supplying compressed air, or other fluid, to the pressure cylinders 83 for operating the same, pipe connections shown in Fig. 14 are employed. A pipe connection 94 and a pipe connection 95 are made to upper and lower ends respectively of each cylinder positioned as shown in the drawing. For purposes of illustration, complete connections are shown for only one of the cylinders 83, namely, the one adjacent one end of the pressure roll 80. Connections 107 and 108, shown in part, are for the pressure cylinder 83 at the corresponding end of roll 79. Connections 109 and 110, shown in part, are for the two cylinders 83 at the opposite ends of rolls 79 and 80.

Referring again to the compressed air pipe connections for the pressure cylinder 83 in Fig. 14, which will serve as a description for corresponding connections for each of the other cylinders, pipes 94 and 95 are connected to a four-way valve 96 in a pipe connection 97 leading to an air inlet pipe 98. The pipe connection 97 is provided with a pressure gauge 99 and a pressure regulator 100. Air forced into the pipe 94 applies pressure to the head of the piston in cylinder 83 which in turn forces the roll 80 against a sheet on the roll 78. To move the roll 80 away from the sheet on the roll 78, the pressure on the head end of the piston is released, and air is admitted through pipe 95 to apply pressure to the crank end of the piston in cylinder 83.

Hand screws for forcing the pressure rolls against a sheet on the glossing roll 78 are not as desirable as the above-described pressure cylinders combined with the controls. The latter permit of more accurate adjustment.

The pressure rolls or so-called squeeze rolls 79 and 80 are steel shells 101 provided with a thick, outer, resinous covering 102 on the cylindrical surface. It has been found, in connection with the present invention, that synthetic rubbers such as neoprene (polymer of chloroprene) and Buna N rubbers such as Hycar (copolymer of butadiene and acrylonitrile), and others, with a Shore "A" hardness of preferably from 60 to 80 are applicable as coverings for the pressure rolls, and are more desirable than natural rubber. The latter tends to oxidize rapidly and produces checks and crazes on the surface. Neoprene has been found highly satisfactory and is preferred in the apparatus described.

Rubbers with the above hardness provide the desired resiliency combined with pressure for the glossing operation. Softer rubbers do not exert enough pressure to cause a sheet to adhere firmly to the glossing roll 78, and, when excess pressure is applied they tend to delaminate from the steel shell of a pressure roll. When the rubbers are too hard, and the pressure too great, the pressure rolls distort a hot sheet as it proceeds through the squeezing operation.

Water-cooling of the pressure rolls 79 and 80 results in longer life of the rubber coverings since operation of the rolls at lower temperatures reduces the tendency toward oxidation and further vulcanization of the rubber. It also keeps the bonding adhesive, which is used to fasten the rubber covering 102 on the steel shell 101, at a lower temperature and prevents a delamination. With water cooling, the temperature on the outer surface of a pressure roll has been kept at about 230° F. when, under comparative conditions in absence of water cooling, it would be about 270° F. The temperature gradient in the rubber layer is such that the temperature at the surface of the steel shell is approximately that of the cooling medium.

The rolls 79 and 80 are mounted for free rotation by contact with a sheet under treatment on the roll 78. Positive driving means are employed for the calender rolls and for the glossing roll 78.

One means of heating the glossing roll 78, as shown, is a heating space 103 (Figs. 14, 15 and 17) provided between double walls. The space is fed with a heating medium through a hollow shaft 104 at either end of the roll. The cooling rolls 74 are provided with similar means for the cooling medium.

For embossing as well as glossing, a roll 78a (Fig. 18) may be substituted for roll 78. Any raised design may be provided on the surface of roll 78a.

Electrical synchronization means (Fig. 19) are used to synchronize the drives of the calender and the polishing roll 78. For this purpose, the motor $M_2$ for the calender operates a transmitter 105 which generates a variable voltage depending on the speed of the motor $M_2$. This variable voltage controls the speed of a motor $M_1$ through a receiver 106. By this means, variations in calendering speeds result in corresponding variations in the polishing roll speeds. The sheet treated is moved lineally through the calender and on the glossing roll at the same rate, thereby preventing distortion while providing the gloss.

The glossing roll 78 is provided with a smooth, refractory, heat-conducting surface such as that obtained with highly polished steel or with polished chrome plating. The surface is preferably of uniform smoothness throughout and must be such that a thermoplastic sheet under treatment will adhere tightly to it. The temperature, maintained by circulation of steam or other thermal fluid in the roll 78, is dependent upon the composition of the thermoplastic film or sheet. The degree of gloss and the perfection of finish obtained are dependent on a number of factors, such as the smoothness of the roll surface, uniformity of direct contact between the sheet and the roll surface, the length of time the sheet is in contact with the hot roll surface, the temperature of the roll surface, the temperature of the sheet entering the pressure or squeeze rolls, and the pressure exerted on the sheet by the pressure rolls. Each of these factors contributes to improvement in the finish.

The dwell of a sheet on the glossing roll 78 can be varied by changing its size, or by varying the speed of its operation. In some cases, a dwell of even one second on a steel glossing roll has provided a remarkably improved finish, particularly with a tightly adhering sheet. When used in combination with a calender for thermoplastic sheets, the glossing roll 78 and the pressure roll 79 should be placed as close as possible to the point where the sheet leaves the calender rolls. This guards against undue heat loss. The polishing operation applied alone to a preformed cooled sheet is best preceded by a preheating step, and the sheet should be at a temperature at which it will adhere to the heated surface of the roll 78. Reheating a cooled plastic sheet, before subjecting it to the glossing process, does not produce as satisfactory results as those obtained by passing the sheet, kept closer to its temperature at formation, directly to the glossing roll. In reheating a previously cooled sheet, some of its substance is lost and the sheet does not subject itself to as good glossing action as when a frehly formed or freshly calendered hot sheet is used.

In the production of a marbleized thermoplastic sheet, the lower the range of temperature at which the sheet is calendered to bring about marbleization, the less the tendency of the plastic to flow and the less the blending of the colors, which results in producing marble patterns that are considered more attractive in the trade. However, a serious disadvantage in the low temperature calendering is that a rougher surface and a reduction in the desired gloss or sheet are obtained. Calendering alone does not assure both the desired marbleization and the improved glossing, since to obtain both, the opposite in temperature extremes is generally required. Considerable improvement is obtained in the finish of a marbleized product in the application of the present invention, by bringing a marbleized sheet from a calender immediately into contact with the glossing roll 78 without permitting the sheet to cool unduly before it reaches the hot glossing roll surface.

Upon transfer of the calendered sheet from the rolls of the cross-calender to the glossing roll 78, the temperature of the calendered sheet and the temperature of the surface of the glossing roll are such as to cause the sheet to become firmly adherent to the surface of the glossing roll when pressed thereagainst by either or both of the pressure rollers 79 and 80. It is also important to maintain a substantial temperature differential between the calendering temperature and the temperature of the glossing roll. Thus, while the temperatures maintained during the calendering are, as aforesaid, substantially below the mixing temperature of the plastic composition, the temperature of the glossing roll is desirably maintained approximately at the mixing temperature or somewhat below the mixing temperature. For example, if the mixing temperature is about 350° F. the temperature of the glossing roll is desirably maintained at about 325° F. to 350° F. However, the sheet is taken to the polishing roll from the calender roll surface which, as aforesaid, is maintained at a temperature of the order of about 260° F. to about 290° F., while it is approximately at the temperature of said calender roll surface, namely, about 35° F. to about 90° F. below that of the glossing roll. Such a temperature differential is desirably maintained, although a somewhat lesser temperature differential of the order of about 25° F. will afford a very substantial improvement, as for example, if the maximum calendering temperature is about 290° F. and the glossing roll temperature is maintained at about 315° F.

It is also to be noted that the surface of the calendered sheet which is pressed into contact with the surface of the glossing roll, is the surface that was formed in contact with the calender roll 68 maintained at a temperature in the range 225° F. to 260° F. For polishing roll temperatures of the order of 315° F. to 350° F. this represents the maintenance of a temperature differential of about 55° F. to about 125° F. The formation of a surface of the finished sheet by successive contact with the calender roll surface and polishing roll surface having such a substantial temperature differential maintained between them is highly important in obtaining improved appearance according to this invention as regards the combined characteristics of good appearance of the mableized pattern and a good gloss finish.

While the polishing roll is normally maintained at a temperature of the order of 315° F. to 350° F., a lower temperature down to about 275° F. could be employed if the calendering temperature is on the lower portion of the aforesaid calendering temperature range of 180° F. to 290° F. On the other hand if the composition formulation is such that the mixing temperature is in the upper portions of the range from about 300° F. to about 375° F. and if the calendering temperature is correspondingly in the upper portion of the 180° F. to 290° F. range or up to 300° F. then the polishing roll temperature may be as high as about 375° F.

Under the conditions aforesaid the marbleized surface of the calendered sheet when taken at calendering temperature to the surface of the glossing roll becomes softened due to the heat of the glossing roll and flows out under the pressure exerted by the pressure rollers 79 and 80 in conformity with the smooth surface of the glossing roll and a remarkable improvement in smoothness is obtained. A pressure of about 50 pounds per linear inch exerted by the pressure rollers 79 and 80 has been satisfactorily used to accomplish the desired pressure contact with the surface of the glossing roll without reducing the sheet thickness, injuring the pattern or otherwise altering the sheet in the condition as calendered except for the improvement in surface gloss.

Due to the fact that the peripheral speed of the glossing roll 78 is synchronized so as to be commensurate with that of calender roll 67 which carries the calendered sheet 82 after its formation and which, therefore, determines the speed at which the calendered sheet emerges from the calender, the calendered sheet is not subjected to tension or other strain while in the heated condition. It is also to be noted that the calendered sheet is stripped from the roll 67 while undergoing upward travel thereon just before passing over the stripping roll 81. In this way the weight of the calendered sheet assists in the separation of the sheet from the roll 67 thereby minimizing the tension for accomplishing the stripping of the sheet from the roll 67. Imposition of tension on the sheet is also minimized by permitting the sheet 82 to, in effect, fall under its own weight from the roll 81 so as to be received on the surface of the roll 78. It is also to be noted that the sheet 82 is stripped from the roll 78 during upward travel of the sheet on the surface thereof, thereby taking advantage of the weight of the sheet so as to accomplish the stripping while minimizing the tension imposed on the sheet.

While the provision of the glossing roll 78 has been illustrated and described in Figs. 13 to 19 in combination with the cross-calendering rolls 66, 67 and 68 and the glossing roll possesses special utility and advantages when so used, the employment of the glossing roll is not limited to this particular application thereof. For example, if the finished product is the jaspe sheet as produced by any or all of the calender rolls 32, 33, 50 and 51, the glossing roll attachment could be made appurtenant to this calender and employed in the same manner and for the purposes that have been hereinabove described in connection with Figs. 13 to 19.

The aforesaid temperatures and temperature differentials are illustrative of those appropriate in connection with a vinyl plastic composition of the typical formulation hereinabove described. For different compositions the temperature prevailing and maintained during the different steps may vary somewhat as compared with those hereinabove given depending primarily on such factors as the softening point of the vinyl resin used, the proportion and kind of filler, and the proportion and efficacy of the plasticizer, those combinations which acquire desired consistency at a higher temperature being processed at correspondingly higher temperatures than those applicable in the case of compositions which acquire the same consistency at a somewhat lower temperature. However, in such case the temperature differentials maintained would remain substantially as hereinabove stated.

While certain temperature ranges have been indicated as occurring in the different operations and steps involved; the temperature that occurs in each of these operations or steps is normally held as rigidly constant as possible in any given production run and roll temperatures are maintained uniform throughout the length of the roll so that uniformity of the finished product will be maintained. Such uniformity is readily accomplished in the practice of this invention as well as exact duplication of results for different production runs. It is important in this trade that a pattern of a given sample be capable of reproduction and substantial duplication, this being a matter that has occasioned particular difficulty in the past. However, the practice of this invention affords a high degree of flexibility in that by varying the conditions that are maintained, even relatively slightly, different color, pattern, and other effects are obtainable. The principal factors as regards pattern effects of variegated color, either jaspe or marbleized, are the temperatures and temperature differentials maintained, the spacings between opposing calender rolls, and the size of the bank maintained at the nip between opposing calender rolls.

In addition to the improvements and advantages that have been mentioned hereinabove, the cross-calendering operation is believed to have special advantages that are peculiar to a thermoplastic composition of the vinyl plastic type. Thus, when a vinyl plastic sheet is calendered in heat plasticized condition, it is believed that certain stresses are set up due to the orientation of the large vinyl molecular chains and of the fillers such as fibrous and other fillers. If a hot calendered sheet is cooled while these strains are retained, they tend to become later released, particularly if the calendered sheet is warmed, thus causing shrinkage. It is believed that the crossing-calendering of the vinyl plastic sheets reduces the extent of the above mentioned orientation and that the stretch-strain tensions in the sheet are thereby reduced. Shrinkage of vinyl plastic sheets is also found to be the result of migration of plasticizers from the sheets into an adhesive used to attach the sheets to a base sheet, e.g., a saturated felt base sheet. Such shrinkage is found to take place in the opposite direction from the filler and vinyl resin orientation. Here again it is believed that the cross-calendering serves to reduce this shrinkage.

Products are obtainable at various stages in the above process which are adapted to find many uses. The process yields pigmented plastic granules or pellets of convenient sizes for handling in molding processes; and plain colored sheets and sheets of variegated color such as jaspe and marbleized are afforded in various thicknesses for various decorative purposes.

The invention hereinabove set forth is embodied and utilized in particular form and manner but may be variously embodied and utilized within the scope of the claims hereinafter made.

What is claimed is:

1. A method of producing a vinyl plastic sheet of variegated color having a marbleized wear surface which comprises firmly adhering a sheet of vinyl composition having a streaked decoration on its surface to a heated calender roll, carrying said sheet with said streaks approximately parallel to the axis of said heated roll while firmly adhered to said heated roll to a nip formed by said roll and a second roll maintained at a temperature below that of said first roll, interfolding said sheet upon itself to form a bank of material substantially across the nip of said rolls thereby breaking up the streaks and continuously passing portions of said bank between said rolls thereby forming a sheet having a marbleized wear surface, said rolls being maintained within the temperature range of about 180° F. to about 290° F. with the cooler of said rolls contacting said marbleized wear surface and being maintained at a temperature substantially below the maximum temperature attained by the composition during the calendering.

2. A method of producing a vinyl plastic sheet of variegated color having a marbleized wear surface which comprises firmly adhering a sheet of vinyl composition having a streaked decoration on its surface to a calender roll heated at a temperature between about 260° F. and about 290° F., carrying said sheet with said streaks approximately parallel to the axis of said heated roll while firmly adhered to said heated roll to a nip formed by said roll and a second roll maintained at a substantially lower temperature than said first roll between about 225° F. and about 260° F., interfolding said sheet upon itself to form a bank of material substantially across the nip of said rolls thereby breaking up the streaks and continuously passing uniform portions of said bank between said rolls thereby forming a sheet having a marbleized wear surface, said marbleized wear surface being in contact with the cooler of said rolls.

3. A method of producing a vinyl plastic sheet of variegated color having a marbleized wear surface which comprises firmly adhering a sheet of vinyl composition having a streaked decoration on its surface to a heated calender roll, carrying said sheet with said streaks approximately parallel to the axis of said heated roll while firmly adhered to said heated roll to a nip formed by said roll and a second roll maintained at a temperature below that of said first roll, interfolding said sheet upon itself to form a bank of material substantially across the nip of said rolls thereby breaking up the streaks and continuously pressing portions of said bank between said rolls thereby forming a sheet having a marbleized wear surface, said rolls being maintained within the temperature range of about 180° F. to about 290° F. with the cooler of said rolls contacting said marbleized wear surface and being maintained at a temperature about 30° F. to about 65° F. below the maximum temperature attained by the composition during the calendering.

4. A method of producing a vinyl plastic sheet of variegated color having a marbleized wear surface which comprises feeding a sheet of vinyl composition having a streaked decoration on its surface into a two roll calendering operation in a direction at approximately a right angle with respect to said streaks on its surface while said sheet is heated to a temperature of about 150° F. to about 250° F. and adhered to the roll with the higher temperature, said calendering operation being between said two calender rolls while maintaining a bank of material substantially across the nip of said two rolls by interfolding said sheet upon itself thereby breaking up the color streaks and forming a sheet having a marbleized wear surface and while maintaining said roll surfaces at substantially different temperatures on the opposite surfaces of said sheet with the cooler of said calender roll surfaces contacting said marbleized wear surface and being maintained at a temperature substantially below the maximum temperature attained by the composition during said calendering.

5. A method of producing a vinyl plastic sheet of variegated color having a marbleized wear surface which comprises feeding a sheet of vinyl composition having a streaked decoration on its surface into a two roll calendering operation in a direction at approximately a right angle with respect to said streaks on its surface while said sheet is heated to a temperature of about 200° F. to about 250° F. and adhered to the roll with the higher temperature, said calendering operation being between said two calender rolls while maintaining a bank of material substantially across the nip of said two rolls by interfolding said sheet upon itself thereby breaking up the color streaks and forming a sheet having a marbleized wear surface and while maintaining said roll surfaces at substantially different temperatures on the opposite surfaces of the sheet within the range of about 180° F. to about 290° F. with the cooler of said calender roll surfaces contacting said marbleized wear surface and being maintained at a temperature substantially below the maximum temperature attained by the composition during said calendering.

6. The process of claim 5 wherein said vinyl composition contains about 50 to about 75% filler material.

7. A method of producing a vinyl plastic sheet of variegated color having a marbleized wear surface which comprises feeding lapped lengths of a jaspe sheet of vinyl composition into a two stage calendering operation in a direction at approximately a right angle with respect to the jaspe streaks while the lapped lengths are heated, the calendering operation being between roll surfaces which are maintained at substantially different temperatures on the opposite surfaces of the sheet with the cooler of said roll surfaces containing the marbleized wear surfaces of the sheet, the first stage of said calendering being between the nip of rolls which unite the lapped lengths into a unitary sheet and firmly adhere the back of said roll surfaces contacting the marbleized wear ture and the second stage of calendering being between two rolls while said unitary sheet is firmly adhered to said hot roll and while maintaining a bank of material substantially across the nip of said two rolls by interfolding the unitary sheet upon itself thereby breaking up the color streak of the jaspe sheet and forming a sheet having a marbleized wear surface.

8. A method of producing a vinyl plastic sheet of variegated color having a marbleized wear surface which comprises feeding into a two stage calendering operation lapped lengths of a jaspe sheet of vinyl composition in a direction at approximately a right angle with respect to the jaspe streaks while the lapped lengths are heated to a temperature of about 200° F. to about 250° F., the calendering operation being between roll surfaces which are maintained at substantially different temperatures on the opposite surfaces of the sheet with the cooler of said roll surfaces contacting the wear surface of the sheet, the first stage of said calendering being between the nip of rolls maintained within the temperature range of about 180° F. to about 290° F. to unite the lapped lengths into a unitary sheet and firmly adhere the back of said unitary sheet to the roll with the higher temperature and the second stage of said calendering being between the nip of said higher temperature roll and a third roll while maintaining said higher temperature roll surfaces within the temperature range of about 225° F. to about 290° F. and while maintaining a bank of material by interfolding the unitary sheet upon itself substantially across the nip of said two rolls thereby breaking up the jaspe streaks to form a sheet having a marbleized wear surface, said third roll being maintained at a temperature substantially below the maximum temperature attained by said unitary sheet.

9. A method of producing a vinyl plastic sheet of variegated color having a marbleized wear surface which comprises feeding into the nip between two calender rolls a jaspe sheet of vinyl composition at a temperature within the range of 200° F. and about 250° F. in a direction at a right angle with respect to the jaspe streaks, carrying the calendered sheet with its back surface in contact with the hotter of the two rolls for a substantial distance to a second nip formed by a third roll and the hotter roll carrying the sheet, maintaining a bank of material substantially across the second nip by interfolding the carried sheet upon itself and calendering the bank of material between said third roll and said hotter roll to break up the color streaks of the jaspe sheet and form a sheet having a marbleized wear surface, the temperature of the hotter roll being maintained between the range of about 260° F. to about 290° F. and the other rolls contacting the wear surface of the sheet being maintained at a substantially lower temperature within the range of about 180° F. to about 260° F.

10. A method of producing a vinyl plastic sheet of variegated color having a marbleized wear surface which comprises feeding into the nip between two calender rolls a jaspe sheet of vinyl composition at a temperature within the range of 200° F. and about 250° F. in a direction at a right angle with respect to the jaspe streaks, carrying the calendered sheet with its back surface in contact with the roll having the higher temperature for a substantial distance to a second nip formed by a third roll and said higher temperature roll carrying the sheet, maintaining a bank of material substantially across the nip of said higher temperature and third rolls which measures from about 1 to 1½ inches in diameter and which continuously interfolds upon itself and calendering the bank of material between said third roll and said higher temperature roll to break up the color streaks of the jaspe sheet and form a sheet having a marbleized wear surface, the temperature of the higher temperature roll being maintained between the range of about 260° F. to about 290° F. and the other rolls contacting the marbleized wear surface of the sheet being maintained at a substantially lower temperature within the range of about 180° F. to about 260° F.

References Cited in the file of this patent
UNITED STATES PATENTS

| | | |
|---|---|---|
| 1,975,515 | Mayer | Oct. 2, 1934 |
| 2,258,659 | Mosler | Oct. 14, 1941 |
| 2,608,717 | Kay | Sept. 2, 1952 |